(12) United States Patent
Woo (10) Patent No.: US 10,353,122 B2
(45) Date of Patent: Jul. 16, 2019

(54) DISPLAY DEVICE AND FABRICATING METHOD THEREOF

(71) Applicant: LG Display Co., Ltd., Seoul (KR)

(72) Inventor: Joungwon Woo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 139 days.

(21) Appl. No.: 14/580,662

(22) Filed: Dec. 23, 2014

(65) Prior Publication Data
US 2015/0309222 A1    Oct. 29, 2015

(30) Foreign Application Priority Data

Apr. 25, 2014   (KR) .................. 10-2014-0050076

(51) Int. Cl.
*F21K 9/64*   (2016.01)
*G02B 5/02*   (2006.01)
(Continued)

(52) U.S. Cl.
CPC .............. *G02B 5/201* (2013.01); *F21K 9/64* (2016.08); *G02B 5/0278* (2013.01); *G02B 5/223* (2013.01)

(58) Field of Classification Search
CPC ......... G02F 1/133603; G02F 1/133609; G02F 2001/133614; H01L 2933/0041; H01L 33/502; H01L 33/504; H01L 51/0005; H04N 9/3129; H04N 9/3158; H04N 9/3182; G02B 5/201; G02B 5/0278; G02B 5/223; G02B 2027/0112; G02B 2027/0118;
(Continued)

(56) References Cited

U.S. PATENT DOCUMENTS 6,712,661 B1   3/2004   Kiguchi et al.
6,864,933 B2 *  3/2005   Broer .................. G02B 26/001
                                                            349/105
(Continued)

FOREIGN PATENT DOCUMENTS

CN     1395135 A     2/2003
CN   103278876 A     9/2013

OTHER PUBLICATIONS

Naoki Tanaka. Sharp's LED Device Exands LCD Color Gamut Without Lowering Brightness. Dec. 17, 2013. https://web.archive.org/web/20131219095221/http://techon.nikkeibp.co.jp/english/NEWS_EN/20131217/323134/.*

(Continued)

*Primary Examiner* — Collin X Beatty
(74) *Attorney, Agent, or Firm* — Morgan, Lewis & Bockius LLP (57) ABSTRACT

A display device includes a light source to generate a beam of a first color. The display device also includes a display panel having at least one pixel including a first color sub-pixel, a second color sub-pixel, and a third color sub-pixel, wherein the second color sub-pixel is configured to generate a beam of the second color by reacting with the beam of the first color, the third color sub-pixel is configured to generate a beam of the third color by reacting with the beam of the first color, and the first color sub-pixel is configured to allow the beam of the first color to pass therethrough. The display device further includes a beam path converter disposed between the light source and the display panel to direct the beam of the first color from the light source toward the display panel.

20 Claims, 9 Drawing Sheets

(51) Int. Cl.
*G02B 5/20* (2006.01)
*G02B 5/22* (2006.01)

(58) Field of Classification Search
CPC .............. G02B 27/0031; G03B 21/204; G03B 21/2066; F21K 9/00
USPC .................. 359/599, 202.1, 27; 348/E9.026; 427/157; 349/108, 61
See application file for complete search history.

(56) References Cited

U.S. PATENT DOCUMENTS

| | | | |
|---|---|---|---|
| 6,870,584 B2 | 3/2005 | Kawase et al. | |
| 7,492,495 B2 | 2/2009 | Ishihara et al. | |
| 7,990,598 B2 * | 8/2011 | Yamazaki | G02B 26/101 |
| | | | 359/202.1 |
| 8,000,005 B2 * | 8/2011 | Kindler | G03B 21/56 |
| | | | 345/84 |
| 8,371,697 B2 * | 2/2013 | Kemp | H04N 9/315 |
| | | | 313/489 |
| 8,847,972 B2 * | 9/2014 | Kane | G01J 1/42 |
| | | | 345/589 |
| 9,405,146 B2 * | 8/2016 | Zhang | G02F 1/133514 |
| 9,945,991 B2 * | 4/2018 | Woo | G02B 5/0236 |
| 2002/0122260 A1 * | 9/2002 | Okazaki | B82Y 20/00 |
| | | | 359/636 |
| 2003/0001992 A1 | 1/2003 | Kawase et al. | |
| 2005/0146258 A1 * | 7/2005 | Weiss | B82Y 20/00 |
| | | | 313/110 |
| 2006/0114419 A1 | 6/2006 | Peterson et al. | |
| 2010/0027146 A1 | 2/2010 | Kim et al. | |
| 2011/0194272 A1 * | 8/2011 | Li | G09F 13/20 |
| | | | 362/84 |
| 2011/0281388 A1 * | 11/2011 | Gough | B82Y 20/00 |
| | | | 438/47 |
| 2013/0083082 A1 * | 4/2013 | Bukesov | C09K 11/7734 |
| | | | 345/690 |
| 2013/0285559 A1 * | 10/2013 | Aoki | H01J 29/20 |
| | | | 315/158 |
| 2013/0335641 A1 * | 12/2013 | Aoki | G03B 21/60 |
| | | | 348/744 |
| 2013/0335677 A1 * | 12/2013 | You | G02F 1/133609 |
| | | | 349/65 |
| 2014/0240676 A1 * | 8/2014 | Maes | G03B 21/204 |
| | | | 353/20 |
| 2015/0004375 A1 * | 1/2015 | Hou | H01L 51/0005 |
| | | | 428/195.1 |
| 2015/0042933 A1 * | 2/2015 | Ueki | G02B 5/0242 |
| | | | 349/108 |
| 2015/0286096 A1 * | 10/2015 | Kim | G02B 5/22 |
| | | | 349/65 |
| 2015/0286120 A1 * | 10/2015 | Ohno | G02B 26/101 |
| | | | 353/84 |
| 2015/0301408 A1 | 10/2015 | Li | |
| 2015/0304614 A1 * | 10/2015 | Hosoki | G09F 9/00 |
| | | | 348/791 |

OTHER PUBLICATIONS

Stanford. Archived Jul. 2, 2010. https://web-beta.archive.org/web/20100702223326/http://solar-center.stanford.edu/SID/activities/GreenSun.html.*
Chinese Office Action dated Jun. 27, 2016 for corresponding Chinese patent application No. 201410815696.3.

* cited by examiner

FIG. 1

RELATED ART

DISPLAY DEVICE AND FABRICATING METHOD THEREOF

The present invention claims the benefit of Korean Patent Application No. 10-2014-0050076 filed in Korea on Apr. 25, 2014, which is incorporated herein by reference for all purposes as if fully set forth herein.

BACKGROUND OF THE INVENTION

Field of the Invention

The present invention relates to a display device and a fabricating method thereof.

Discussion of the Related Art

Various types of flat panel displays including a liquid crystal display (LCD), a plasma display panel (PDP), an organic light emitting display (OLED), an electrophoresis display (EPD), a field emission display (FED), and the like have been developed. The flat panel displays can be manufactured thinner and lighter than cathode ray tubes (CRTs), and can implement a large screen with low power consumption. A display panel of the flat panel display includes pixels and signal lines for applying electrical signals to the pixels. Driving circuits for applying data and scan signals to the signal lines of the display panel may be connected to the display panel or be built into the display panel. Some of the flat panel displays may be implemented as projection displays for implementing large screen views using small-sized displays.

A projection display magnifies beams of an image displayed on a small-sized display panel using an optical system and displays the magnified beams on a large-sized screen, thereby implementing a large screen view.

Figure 1:
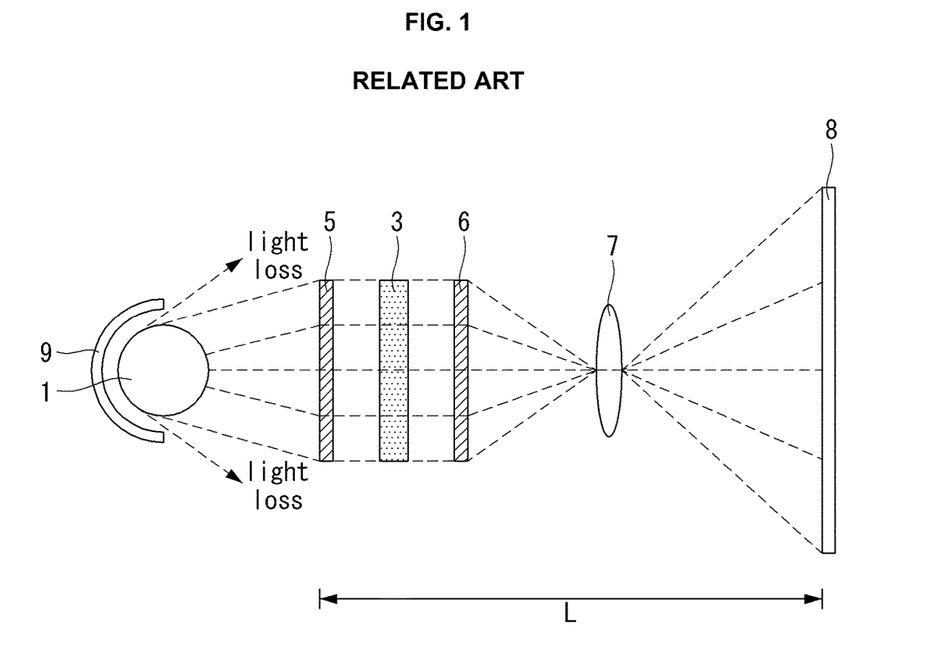
FIG. 1 is a view showing a related art projection display.

As shown in FIG. 1, a related art projection display includes a light source 1, a display panel 3, a screen 8, and an optical system disposed between the light source 1 and the large-sized screen 8. A reflecting mirror 9 is mounted at the rear of the light source 1.

Beams from the light source 1 are incident on the display panel 3. The display panel 3 is manufactured as a small-sized display panel to change the amount of beams depending on data of input images, thereby displaying images. The display panel 3 may be implemented as a display through which beams can pass, e.g., an LCD or a digital light processing (DLP) display. The beams passing through the display panel 3 are magnified and projected on the large-sized screen 8.

The beams radiated from the light source 1 advance in all directions. For this reason, light loss occurs in the related art projection display. In order to reduce the light loss, the reflecting mirror 9 is disposed at the rear of the light source 1 to reflect beams radiated toward the rear of the light source 1.

The optical system includes a plurality of lenses for concentrating beams on the small-sized display panel 3 and magnifying and projecting beams passing through the small-sized display panel 3 toward the screen 8. The optical system may include a first fresnel lens 5 disposed between the light source 1 and the display panel 3, and a second fresnel lens 6 and a projection lens 7 disposed between the display panel 3 and the screen 8.

The first fresnel lens 5 concentrates beams from the light source 1 on the display panel 3. The second fresnel lens 6 concentrates beams passing through the display panel 3 on the projection lens 7. The projection lens 7 magnifies and projects beams from the second fresnel lens 6 toward the screen 8. Thus, a viewer can watch images magnified and displayed on the screen 8.

The related art projection display has the following problems.

First, beams from the light source 1 are concentrated on the display panel 3 as shown in FIG. 1, but only a portion of the beams generated from the light source 1 is used to illuminate an image. Hence, much light loss occurs.

Second, many signal lines, switching elements such as thin film transistors (hereinafter, referred to as "TFTs"), driving elements, driving circuits, and the like are formed in the display panel 3. Hence, the aperture ratio and luminance of the display panel 3 are low, and it is difficult to implement high resolution. When the screen 8 is enlarged and a projection distance L is extended in order to implement a large screen view using the small-sized display panel 3, the luminance decreases as the image is enlarged. Therefore, in the related art projection display, it is difficult to increase luminance, and it is difficult to increase color gamut and resolution as images of the display panel are enlarged.

Third, when the screen 8 becomes large sized, a high-power lamp for image enlargement is required. Hence, the complexity and weight of the optical system increase.

Fourth, an extra-high pressure mercury lamp is frequently used as the light source 1. The extra-high pressure mercury lamp generates much heat and has a short lifespan. Hence, the periodic management of the extra-high pressure mercury lamp is required to replace the light source. The lifespan of the extra-high pressure mercury lamp is within about 6000 hours. The extra-high pressure mercury lamp also causes an environmental pollution problem.

Fifth, thin film layers formed in the display panel 3 are mostly deposited and patterned at a high-temperature, and hence a glass substrate is frequently used as a substrate of the display panel 3. Therefore, in the related art projection display, it is difficult to apply a flexible material to the display panel 3.

SUMMARY OF THE INVENTION

Accordingly, the present invention is directed to a display device and a fabricating method thereof that substantially obviate one or more of the problems due to limitations and disadvantages of the related art.

An object of the present invention is to provide a display device and a fabricating method thereof, which can reduce light loss and improve image quality on a large-sized screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device includes: a light source to generate a beam of a first color; a display panel having at least one pixel including a first color sub-pixel, a second color sub-pixel, and a third color sub-pixel, wherein the second color sub-pixel is configured to generate a beam of the second color by reacting with the beam of the first color, the third color sub-pixel is configured to generate a beam of the third color by reacting with the beam of the first color, and the first color sub-pixel is configured to allow the beam of the first color to pass therethrough; and a beam path converter disposed between the light source and the display panel to direct the beam of the first color from the light source toward the display panel.

In another aspect, a method for fabricating a display device, including a display panel having at least one pixel, includes: forming a bank pattern on a transparent array substrate of the display panel, the bank pattern dividing the at least one pixel into a first color sub-pixel, a second color sub-pixel, and a third color sub-pixel; forming a second color dopant solution in the second color sub-pixel on the transparent array substrate and a third color dopant solution in the third color sub-pixel on the transparent array substrate; and curing the first color dopant solution and the second color dopant solution, wherein no dopant solution is formed in the first color sub-pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXAMPLE EMBODIMENTS

Reference will now be made in detail to embodiments of the invention, examples of which are illustrated in the accompanying drawings. Wherever possible, the same reference numbers will be used throughout the drawings to refer to the same or like parts. Detailed description of known art may be omitted.

In the example embodiments of the present invention, one or more of the signal lines, switching elements, driving circuits, and the like may not be formed in a display panel, and only pixels excited by beams of a specific wavelength to emit beams may be formed in the display panel. Thus, in the present invention, higher luminance and higher image quality can be implemented on a large-sized screen with a less complicated optical system.

Figure 2:
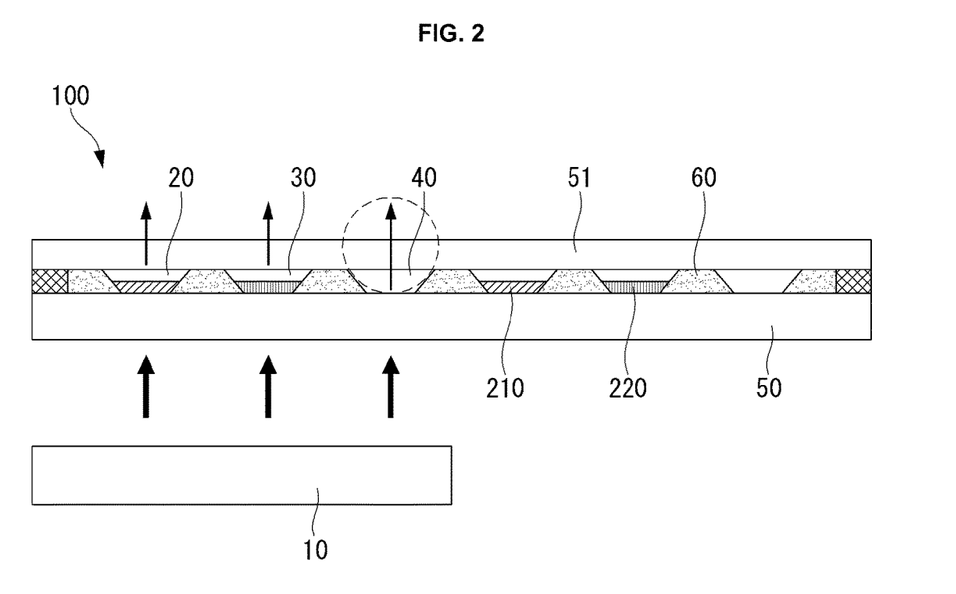
FIG. 2 is a view showing a display device according to an example embodiment of the present invention.

As shown in FIG. 2, a display device according to an example embodiment of the present invention is configured with a light source 10 and a display panel 100.

The light source 10 may generate a blue beam. The light source 10 may be implemented as a light emitting diode (LED), a laser diode (LD), or the like. The light source 10 may include at least one of the LED and the LD. A mercury lamp has a high explosion probability and thus becomes a factor causing a defect of the display device. The mercury lamp may also cause environmental pollution. On the other hand, the LED or LD has a longer lifespan, and can be manufactured using eco-friendly materials. For example, the LD may be implemented as a semiconductor LD such as a GaN LD, and the lifespan of the LD is about a few hundred thousands of hours.

The display panel 100 may include a transparent array substrate 50 and an encapsulation layer 51. Pixels emitting beams of various colors may be arranged in a matrix form on the array substrate 50 in order to implement color images. Each pixel may include a red (R) sub-pixel, a green (G) sub-pixel, and a blue (B) sub-pixel, but the present invention is not limited thereto. For example, one or more of white, cyan, magenta and yellow sub-pixels may be further included or included in place of one or more of red, green, and blue sub-pixels in each pixel.

Since beams generated from the light source 10 are to pass through the array substrate 50, the array substrate 50 may be implemented as a glass substrate or a transparent plastic substrate. The pixels may be formed on the array substrate 50 through a low-temperature process using an inkjet spraying method, which will be described later. As a result, the array substrate 50 may also be implemented as a flexible plastic substrate or a flexible film substrate.

A bank pattern 60 may be formed of benzocyclobutene (BCB)-based resin, acrylic-based resin, polyimide (PI)-based resin, or the like. The bank pattern 60 blocks beam leakage between the sub-pixels and prevents color mixture between adjacent sub-pixels.

A red sub-pixel 20 includes a red dopant 210 that generates beams of a red wavelength (hereinafter, referred to as "red beams") by reacting with beams of a blue wavelength (hereinafter, referred to as "blue beams") from the light source 10. A green sub-pixel 30 includes a green dopant 220 that generates beams of a green wavelength (hereinafter, referred to as "green beams") by reacting with the blue beams from the light source 10. A blue sub-pixel 40 does not include any emission layer or color filter. Only a transparent substrate exists without any color filter or emission dopant in a blue sub-pixel area of the array substrate 50. If a blue beam is incident on the blue sub-pixel 40, the blue sub-pixel 40 displays blue.

The encapsulation layer 51 covers the pixels of the array substrate 50. The encapsulation layer 51 protects the dopants of the pixels from external moisture and foreign matters. The encapsulation layer 51 may be implemented as a thin film encapsulation (TFE) to be adhered to the array substrate 50. However, the present invention is not limited thereto, and the encapsulation layer 51 may be implemented in various forms.

The display device according to the example embodiment of the present invention may emit blue beams from the light source 10, and red and green beams using red and green dopants excited by the blue beams, thereby displaying color images. In the display device according to the example embodiment of the present invention, blue beams having high linearity may be directly irradiated on the substrate to allow the red and green dopants 210 and 220 to generate red and green beams, thereby implementing full colors. Hence, it is unnecessary to form, in the display panel 100, signal lines for supplying electrical signals including data and scan voltages to the pixels, switching elements, driving elements, driving circuits, and the like. Thus, the aperture ratio of the display panel 100 can be significantly improved, and light loss can be minimized or significantly reduced.

Figure 3:
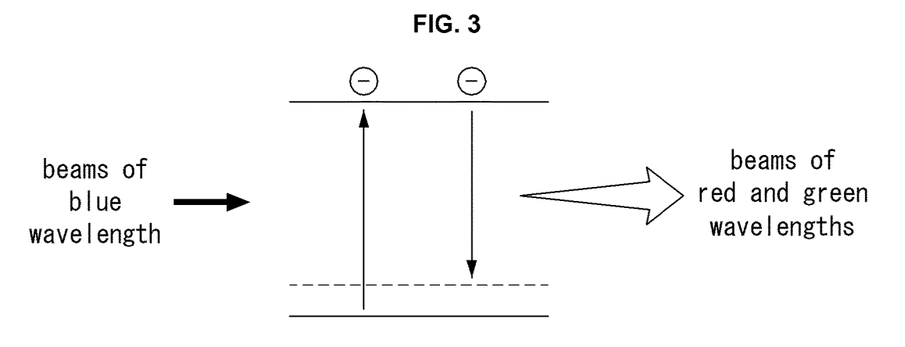
FIG. 3 is a view showing a process of radiating beams of a specific wavelength.

As shown in FIG. 3, the red dopant 210 may generate a red beam having a wavelength of 570 to 850 nm by reacting with a blue beam having a wavelength of 400 to 490 nm, and the green dopant 220 may generate a green beam having a wavelength of 490 to 570 nm by reacting with a blue beam with a wavelength of 400 to 490 nm. If the blue beam from the light source 10 is incident on the red and green dopants 210 and 220, the dopants are excited. In this state, electrons drop from an excited state to a ground state, thereby emitting beams.

Fluorophore products of the following Table 1 may be used as materials of the red and green dopants.

TABLE 1

| Dopant Color | Fluorophore | Excitation Peak (nm) | Emission Peak (nm) |
| --- | --- | --- | --- |
| Blue | DyLight 405 | 400 | 421 |
| Blue | Aminomethylcoumarin, AMCA | 350 | 450 |
| Green | Cyanine, Cy2 | 492 | 510 |
| Green | Alexa Fluor ®488 | 493 | 519 |
| Green | Fluorescin, FITC/DTAF | 492 | 520 |
| Green | Indocarbocyanine, Cy3 | 550 | 570 |
| Green | Tetramethyl Rhodamine, TRITC | 550 | 570 |
| Red | Rhodamine Red-X, RRX | 570 | 690 |
| Red | Alexa Fluor ®594 | 591 | 616 |
| Red | Texas Red, TR | 596 | 620 |
| Red | Alexa Fluor ®647 | 651 | 667 |
| Red | Indodicarbocyanine, Cy5 | 650 | 670 |
| Red | Alexa Fluor ®680 | 684 | 702 |
| Red | Alexa Fluor ®790 | 792 | 803 |

Although the wavelength of beams which a dopant can absorb the best may not correspond to that of beams generated from the light source, beam emission is possible when the dopant absorbs the beams generated from the light source.

As shown in Table 1, an FITC dopant may be used as an example of the green dopant 220 emitting the green beam. The wavelength of beams which the FITC dopant can absorb the best is about 492 nm. Hence, when a blue beam of about 450 nm is irradiated, the absorption efficiency of the dopant is low. As described above, beam emission is possible even when the absorption efficiency is low as the wavelength of the beams from the light source is different from the maximum absorption wavelength of the dopant. Although there is a potential problem of reduction in luminance, the problem can be addressed by increasing the thickness of the dopant and increasing the power of the light source.

An iridium complex may be used as the red dopant 210. In this case, the red dopant 210 may radiate the red beam by directly receiving the blue beam.

As another example, in Table 1, a product excited by the green beam may be selected as the red dopant 210. That is, a mixture of the red and green dopants 210 and 220 may be coated in the red sub-pixel 20. In this case, the green dopant 220 is excited by the blue beam to generate the green beam, and accordingly, the red dopant 210 is excited to generate the red beam. In this process, when the generation of the green beam, caused by the excitation of the green dopant 220, is overlapped with the absorption characteristic of the red dopant 210, the energy of the green beam is transferred to the red dopant 210. Thus, the generation of the green beam is suppressed, and only the red beam is generated.

The red and green dopants 210 and 220 are not limited to the aforementioned example embodiments, and may be applied as dopants of any fluorescent or phosphorescent material that emits beams by reacting with the blue beam.

Figure 4:
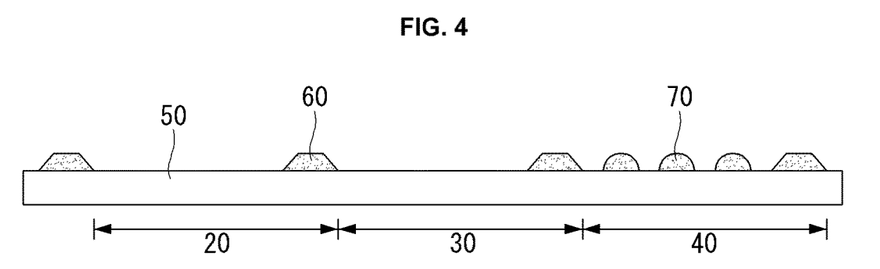
FIG. 4 is a view showing a state in which a scattering layer is formed on a blue pixel area.
Figure 5:
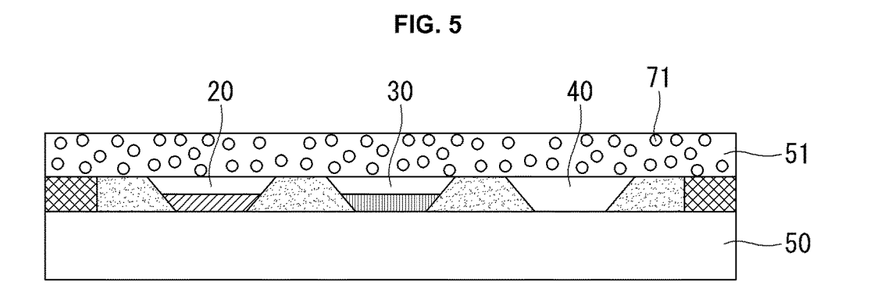
FIG. 5 is a view showing a state in which the scattering layer is formed by containing scattering bodies in an encapsulation layer.

The blue beam irradiated from the light source 10 passes through the blue sub-pixel 40 having a transparent structure. Hence, if the linearity of the blue beam is high, the display device may have a smaller viewing angle and lower color uniformity. In consideration of this, a scattering layer may be formed in the blue sub-pixel 40 or one or more sub-pixels. As an example, in the present invention, a scattering layer 70 may be formed as a fine pattern simultaneously patterned with the bank pattern 60 in the blue sub-pixel 40 as shown in FIG. 4. The scattering layer 70 may be formed in sub-pixels of another color as well as the blue sub-pixel 40. As another method for forming the scattering layer, the scattering layer may be formed in the entire pixel array by containing scattering bodies 71 in the encapsulation layer 51 as shown in FIG. 5, or may be formed in only the blue sub-pixel 40 or in one or more sub-pixels. The scattering bodies 71 may be beads. The scattering layer scatters the blue beam passing through the blue sub-pixel 40, thereby diffusing the blue beam at a wide angle. As a result, the blue sub-pixel is viewed at a wide viewing angle as well as the red and green sub-pixels. Thus, the viewing angle of the display device can be widened, and the color uniformity of the display device can be increased.

Both the array substrate 50 and the encapsulation layer 51 may be made of a transparent material. In this case, beams of the light source 10 can reach pixel areas even though the beams are irradiated in any direction. Hence, the light source 10 may be disposed in any direction such as the rear or front of the display panel 100.

The example display device according to the present invention may be implemented as a direct view type (or rear projection type) display device, a reflection type display device, or the like according to an irradiation direction of the light source 10. A beam path converter 330 (see FIG. 10) for moving beams along a scan direction may be disposed between the light source 10 and the display panel 100. The beam path converter 330 may reflect one beam towards pixels, and move the beam to other pixels by appropriately changing the reflection angle, so that all the pixels of the display panel 100 can emit beams using one light source 10.

Figure 6:
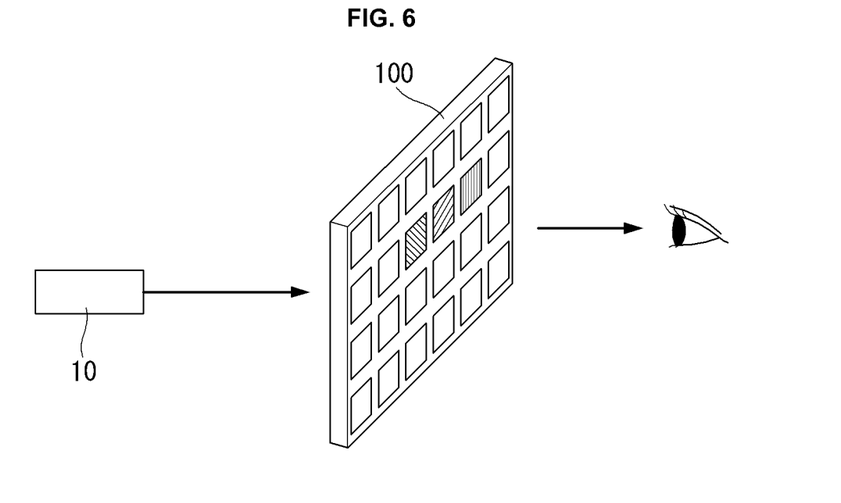
FIG. 6 is a view showing an example of a direct view type (or rear projection type) display device according to an example embodiment of the present invention.

FIG. 6 shows an example of a direct view type (or rear projection type) display device.

Figure 7:
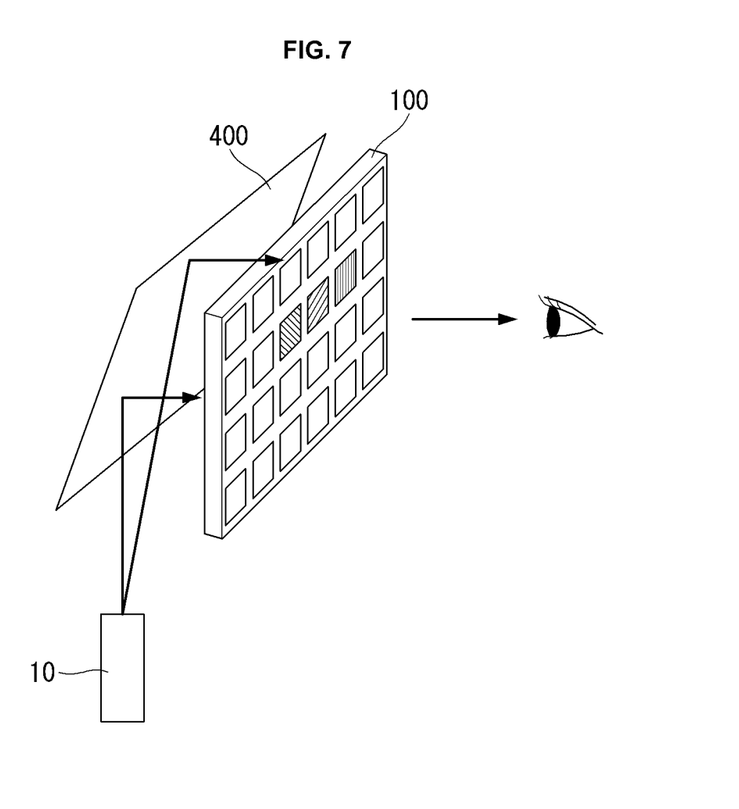
FIG. 7 is a view showing an example of a display device using a reflecting mirror as the direct view type (or rear projection type) display device according to an example embodiment of the present invention.

As shown in FIG. 6, in the direct view type (or rear projection type) display device, the light source is disposed at the rear of the display panel 100. In the direct view type (or rear projection type) display device, in order to reduce the distance between the light source 10 and the display panel 100, a reflection plate 400 may be mounted between the light source 10 and the display panel 100 as shown in FIG. 7. The reflection plate 400 reflects the blue beam from the light source 10 toward the pixels of the display panel 100. The reflection plate 400 is used to reduce the thickness between the display panel 100 and the reflection plate 400. The reflection plate 400 is not rotated but inclined at a specific angle. For reference, the reflection plate 400 is a component different from reflecting mirrors 310 and 320 of the beam path converter 330 shown in FIG. 10. The reflecting mirrors 310 and 320 rotate along x-axis and y-axis directions and reflect the blue beam to a desired pixel position, thereby scanning pixels. In the display device of the present invention, the reflecting mirrors 310 and 320 of the beam path converter 330 may be applied together, or one or both of the reflecting mirrors may be omitted.

Figure 8:
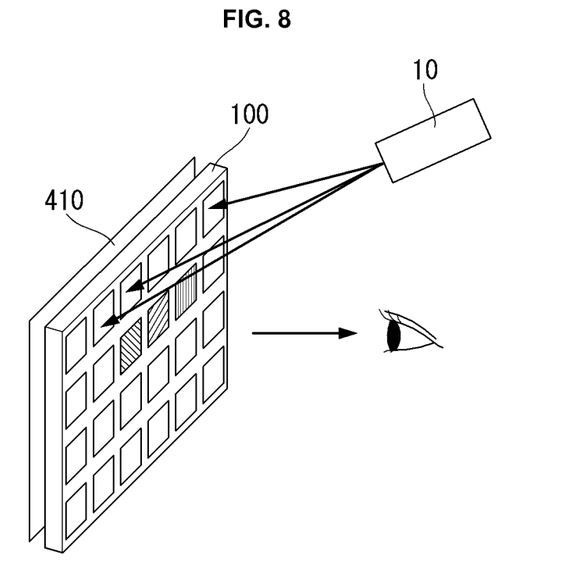
FIG. 8 is a view showing an example of a reflection type display device according to an example embodiment of the present invention.

FIG. 8 shows an example of a reflection type display device in which the light source is disposed at the front of the display panel, as the display device according to the present invention.

The reflection type display device, as shown in FIG. 8, may include a reflection plate 410 disposed to face the rear of the display panel 100. The reflection plate 410 reflects red, green and blue beams back toward the display panel 100, thereby preventing light loss. The reflection plate 410 may be formed at the rear of the display panel 100 to be adhered closely to the pixels.

In the example embodiments of the present invention, an input image may be displayed onto the display panel 100 without being projected. As a result, high luminance and high image quality can be implemented without the use of a high-power lamp or a reduction in luminance.

Figure 9:
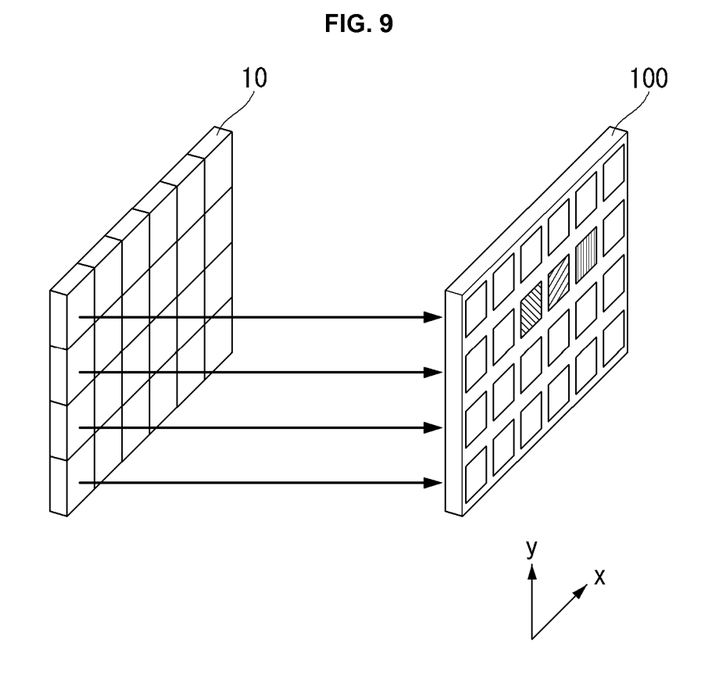
FIG. 9 is a view showing a state in which beams of a blue wavelength are irradiated according to an example embodiment of the present invention.

One light source 10, as shown in FIG. 9, may be disposed per one pixel. In this case, the device cost may increase due to an increase in the number of light sources 10.

Figure 10:
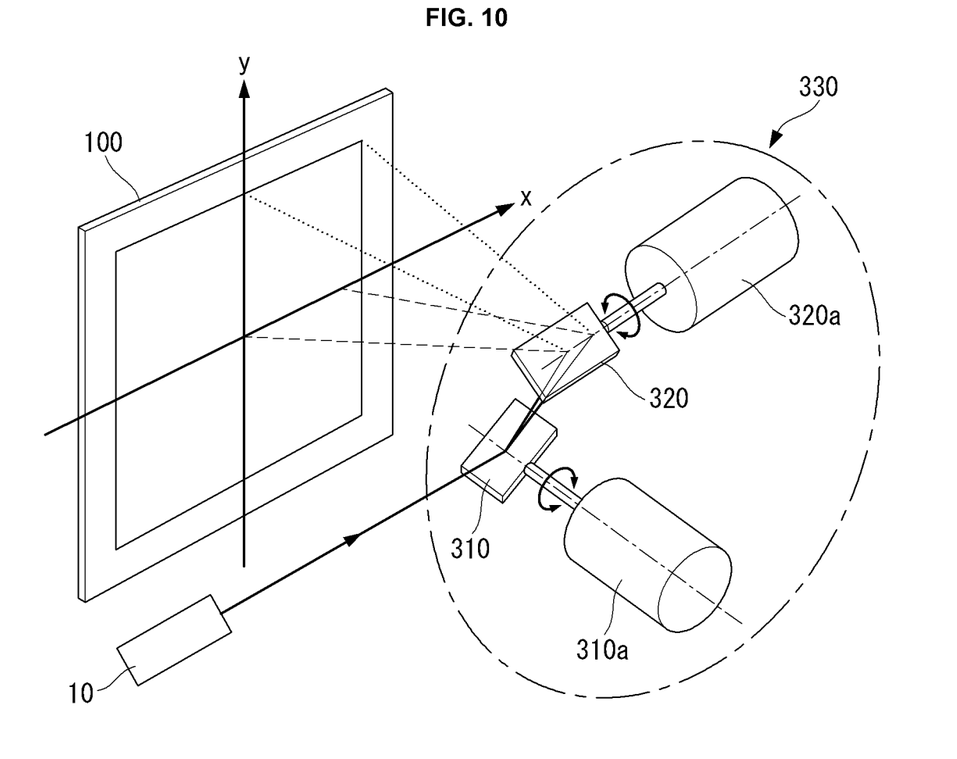
FIG. 10 is a view showing a state in which beams of the blue wavelength are irradiated according to an example embodiment of the present invention.

FIG. 10 is a view showing an example in which one light source 10 scans a plurality of pixels using the beam path converter 330.

As shown in FIG. 10, the beam path converter 330 may be implemented with a galvanometer mirror system. The galvanometer mirror system includes an x-axis galvanometer scanner 310a for rotating an x-axis reflecting mirror 310 in response to an electrical signal, and a y-axis galvanometer scanner 320a for rotating a y-axis reflecting mirror 320 in response to an electrical signal. Each of the x-axis and y-axis reflecting mirrors 310 and 320 can be sufficiently implemented with one mirror.

The beam path converter 330 reflects a blue beam generated from one light source 10 toward a desired pixel position, thereby scanning all the pixels. In the display device according to the example embodiments of the present invention, a complicated optical system can be omitted using the beam path converter 330.

Figure 11:
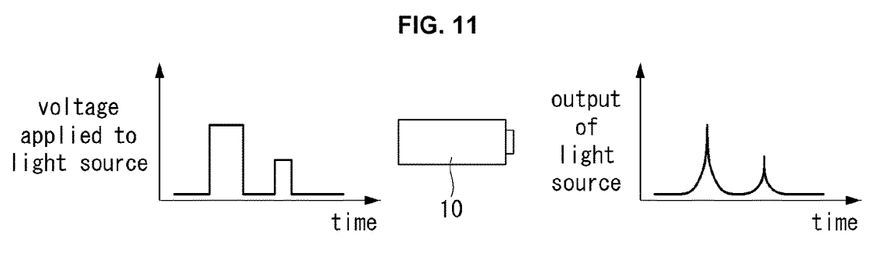
FIG. 11 is a view showing a method for adjusting the light emission intensity of pixels according to an example embodiment of the present invention.

The display device according to the example embodiments of the present invention may express the gray scale of the input image using a signal applied to the light source 10, or may express the gray scale of the input image using a modulator electrically controlled to regulate beams. For example, as shown in FIG. 11, the signal applied to the light source is modulated through pulse amplitude modulation (PAM), pulse width modulation (PWM), pulse frequency modulation (PFM), or the like according to the gray scale of an input image, thereby controlling the output intensity and the output time of the light source.

Figure 12:
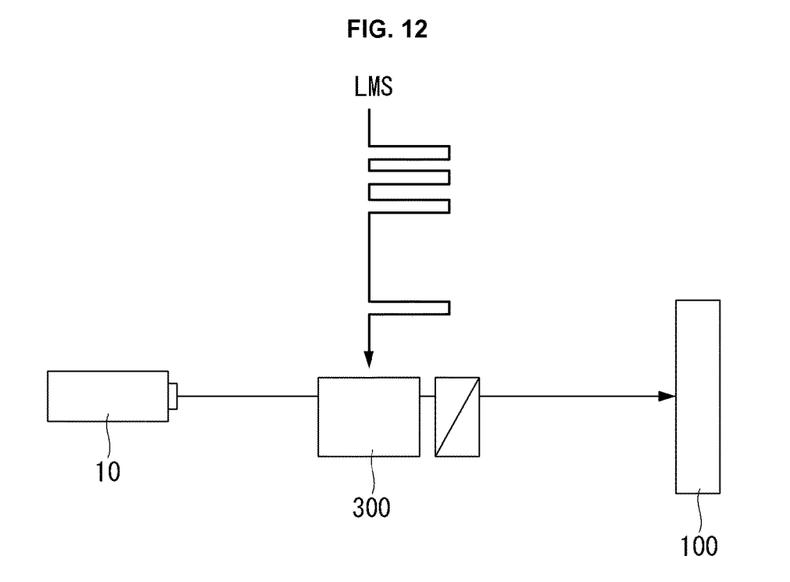
FIG. 12 is a view showing a method for adjusting the light emission intensity of pixels by disposing a modulator according to an example embodiment of the present invention.

A modulator 300, as shown in FIG. 12, may be mounted between the light source 10 and the display panel 100. The modulator 300 regulates beams from the light source 10 in response to a beam control signal LMS modulated according to the gray scale of an input image.

Figure 13A:
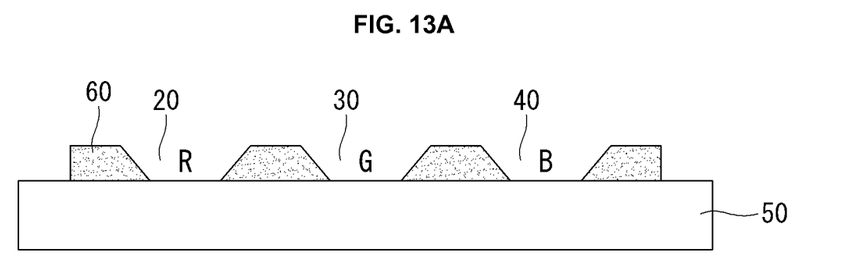
FIGS. 13A to 13C are sectional views showing a fabricating method of a display panel according to an example embodiment of the present invention.
Figure 13B:
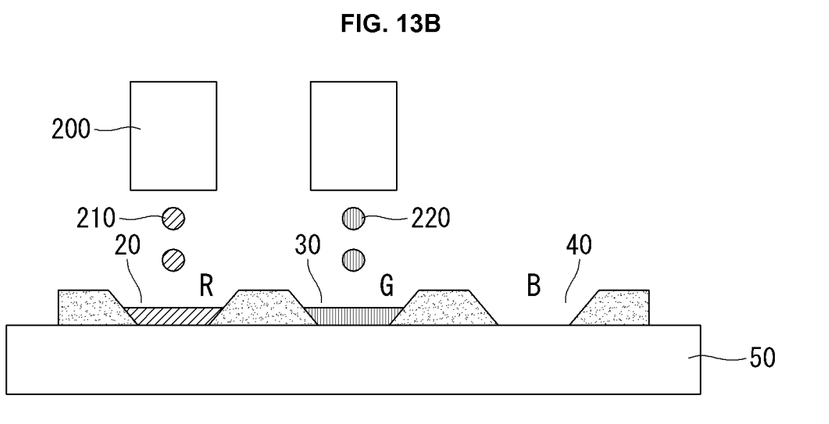

In the example embodiments of the present invention, red and green sub-pixels may be formed in the display panel through a low-temperature process using an inkjet spraying method as shown in FIGS. 13A and 13B. An example of the inkjet spraying method has been disclosed in the U.S. Pat. No. 6,712,661B1, issued on Mar. 30, 2004. Other known inkjet spraying methods may be employed.

Figure 13C:
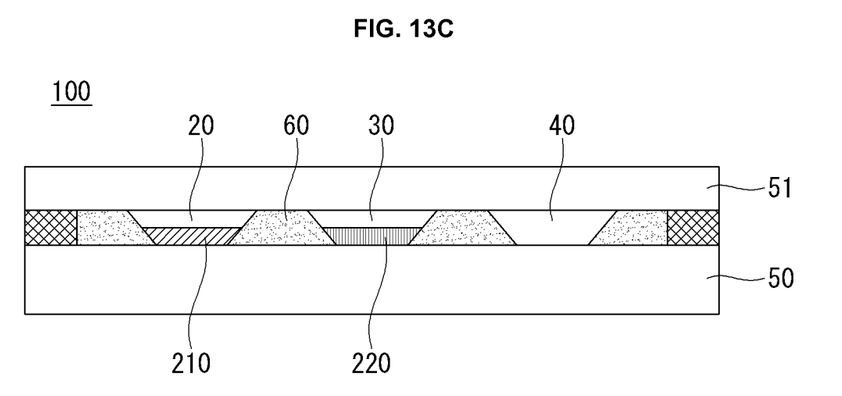

In an example embodiment of the present invention, the bank pattern 60 for dividing each pixel into the red, green and blue sub-pixels 20, 30 and 40 is formed on the array substrate 50 as shown in FIG. 13A. Red and green dopant solutions are then formed in the respective red and green sub-pixels 20 and 30 using an inkjet head 200 as shown in FIG. 13B. Subsequently, the red and green dopants 210 and 220 are cured, and the pixel array of the array substrate 50 is then covered with the encapsulation layer 51 as shown in FIG. 13C.

Figure 14A:
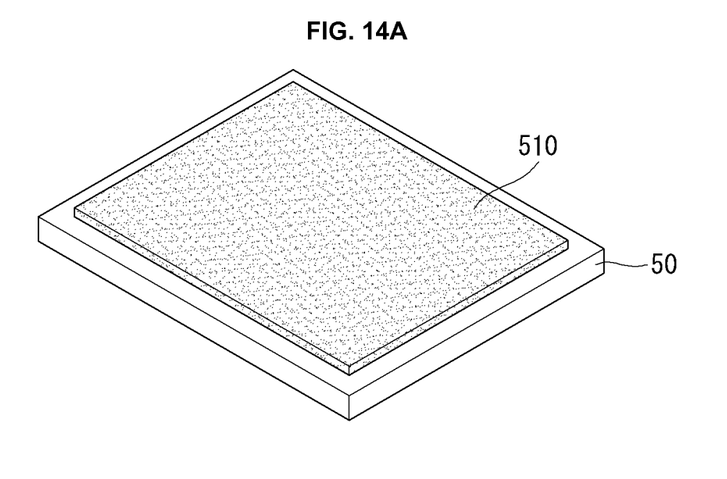
FIGS. 14A to 14C are views showing an example process for forming a bank.
Figure 14B:
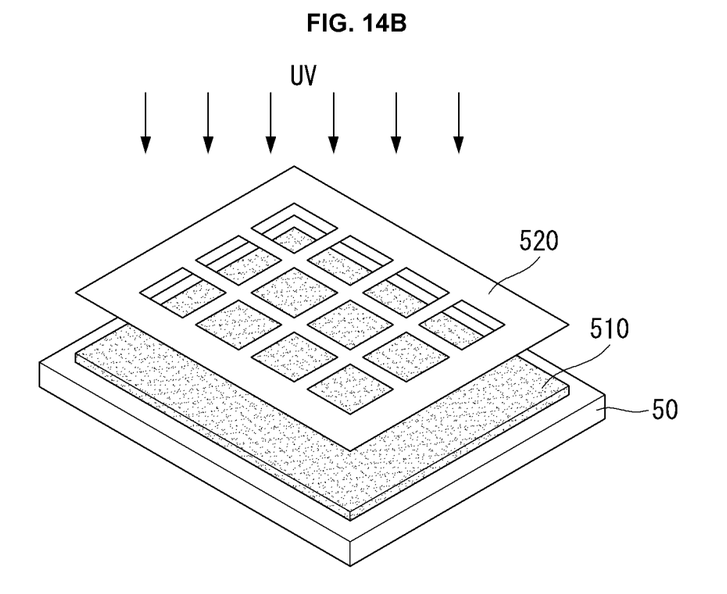
Figure 14C:
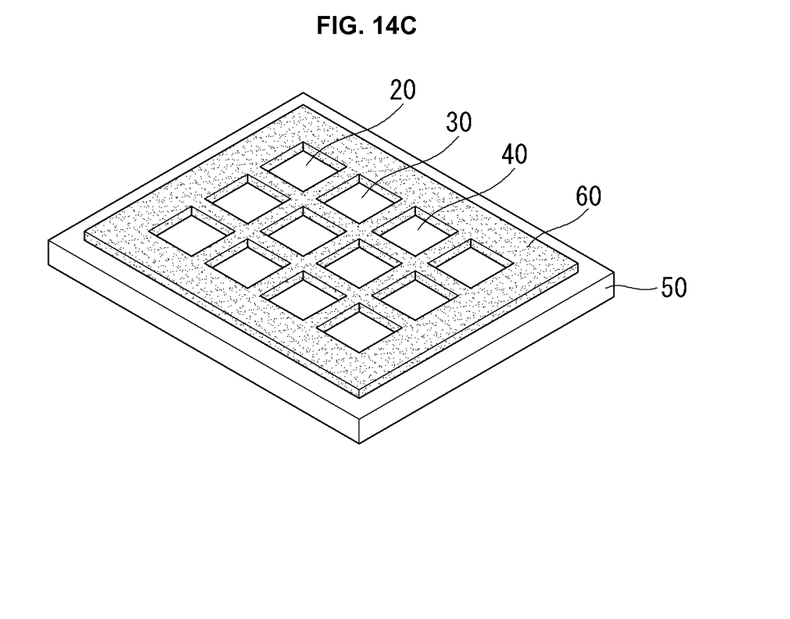

FIGS. 14A to 14C show an example photolithography process for forming the bank pattern 60.

Figure 15:
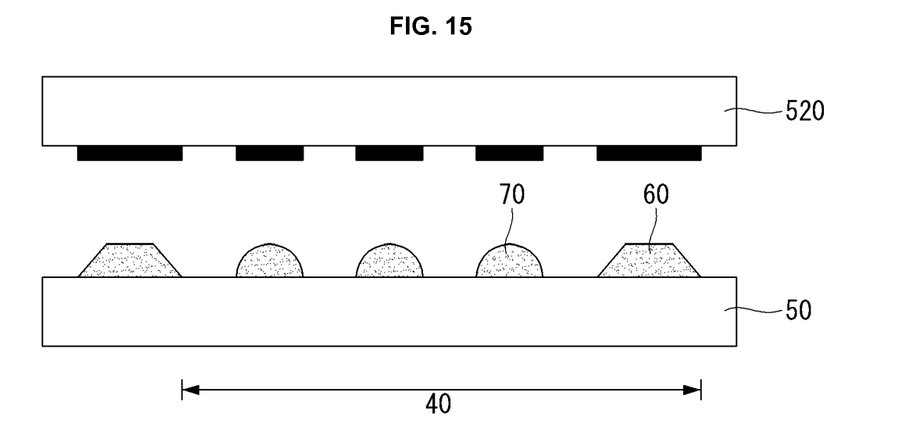
FIG. 15 is a view showing an example method for forming a scattering layer on a blue pixel area.

As shown in FIGS. 14A to 14C, a resin 510 that is a raw material of the bank pattern is coated on the array substrate 50. A photo-acryl or polyimide (PI)-based material may be used as the resin 510. A photo mask 520 patterned in a pixel array form is aligned on the resin 510. Subsequently, ultraviolet (UV) exposure, development and etching processes are performed to form the bank pattern 60 on the array substrate 50 as shown in FIG. 14C. The scattering bodies 70 described above may also be formed together with the bank pattern 60 on the array substrate 50 as shown in FIG. 15.

The present invention has the following advantages.

In the present invention, beams may be directly irradiated at pixel positions of the display panel using, as the light source, an LD, an LED, or the like which has a small diffusion angle of beams as compared with the related art mercury lamp. Hence, it is possible to reduce light loss.

In the present invention, one or more of signal lines, switching elements, driving elements, driving circuits, and the like, which can block beams, are not formed in the display panel. Hence, it is possible to increase the aperture ratio of the display panel.

In the present invention, as described above, the light loss may be reduced, and the aperture ratio may be increased. Hence, it is possible to increase the luminance of the display device.

In the present invention, the LD, the LED, or the like, which has a long lifespan and has less bad influence on environment, may be used as the light source. Hence, it is possible to solve a potential environmental problem caused by the related art light source.

In the present invention, beams passing through the blue sub-pixel may be diffused using the scattering layer, so that the blue sub-pixels can be viewed at a wide viewing angle as well as can the red and green sub-pixels. As a result, it is possible to solve a potential problem in that the viewing angle is limited due to the blue beam having high linearity, thereby implementing a wide viewing angle display device.

In the present invention, beams irradiated from one light source are scanned by rotating the x-axis and y-axis mirrors.

Hence, the configuration of a complicated and heavy optical system is not required. Thus, it is possible to reduce the weight of the display device.

In the present invention, beams may be directly emitted through the excitation of a dopant on each sub-pixel area of the display panel. Hence, an image enlargement process is not included, thereby implementing a large-sized screen having high image quality.

In the present invention, an emission layer may be formed on the substrate through a low-temperature process, and hence a flexible substrate can be applied. Thus, it is possible to implement a product that can be kept in a state in which the product is bent or folded.

It will be apparent to those skilled in the art that various modifications and variations can be made in the display device and manufacturing method thereof of the present invention without departing from the spirit or scope of the invention. Thus, it is intended that the present invention cover the modifications and variations of this invention provided they come within the scope of the appended claims and their equivalents.

What is claimed is:

1. A display device, comprising:
    a light source to generate a beam of a first color; and
    a display panel having a transparent substrate configured to allow the beam of the first color from the light source to pass therethrough, at least one pixel, and a bank pattern disposed on the substrate in a shape of a plurality of protrusions to divide the one pixel into a first color sub-pixel, a second color sub-pixel, and a third color sub-pixel, wherein:
        the second color sub-pixel includes a first dopant, and the third color sub-pixel includes a second dopant,
        the second color sub-pixel is configured to generate a beam of a second color based on the first dopant reacting with the beam of the first color,
        the third color sub-pixel is configured to generate a beam of a third color based on the second dopant reacting with the beam of the first color,
        the first color sub-pixel does not include any emission dopant or color filter, and is configured to allow the beam of the first color to pass therethrough, and
        the beam of the first color passing through the substrate is same as the beam of the first color reaching the first color sub-pixel, the second color sub-pixel, and the third color sub-pixel,
    wherein the display panel further includes an encapsulation layer directly on the bank pattern and covering the at least one pixel to protect the first and second dopants from external moisture.

2. The display device of claim 1, wherein the display panel lacks at least two of a signal line, a switching element, a driving element and a driving circuit.

3. The display device of claim 1, wherein at least one of the first color sub-pixel, the second color sub-pixel, and the third color sub-pixel includes a scattering layer, the scattering layer being formed between two adjacent banks in the bank pattern and directly on a same underlying layer as the bank pattern.

4. The display device of claim 1, wherein the display panel further includes a scattering layer only in the first color sub-pixel among the first, second, and third color sub-pixels, and
    wherein the scattering layer is directly on a same underlying layer as at least one of the first dopant and the second dopant.

5. The display device of claim 1, wherein the bank pattern blocks beam leakage between two adjacent sub-pixels among the first color sub-pixel, the second color sub-pixel, and the third color sub-pixel.

6. The display device of claim 1, wherein the encapsulation layer has scattering bodies over at least one of the first color sub-pixel, the second color sub-pixel, and the third color sub-pixel.

7. The display device of claim 6, wherein the encapsulation layer includes the scattering bodies over only the first color sub-pixel among the first, second, and third color sub-pixels.

8. The display device of claim 1, wherein the light source includes at least one of a laser diode and a light emitting diode.

9. The display device of claim 1, further comprising a beam path converter including a first mirror and a second mirror, the beam path converter being configured to rotate at least one of the first mirror around a first axis and the second mirror around a second axis to move the beam of the first color toward at least one of the first color sub-pixel, the second color sub-pixel, and the third color sub-pixel.

10. The display device of claim 1, wherein the first color is blue, the second color is red, and the third color is green.

11. An apparatus, comprising:
    an array substrate configured to have a matrix of pixels and to have transparency characteristics, the array substrate having a bank pattern disposed thereon;
    an encapsulation layer directly on the bank pattern of the array substrate and covering the pixels;
    optical elements, adjacent to any one among a back surface and a front surface of the array substrate, configured to direct light towards the array substrate; and
    a light source, adjacent to the array substrate, configured to provide to the array substrate, blue light which is converted into red-green-blue (RGB) light upon passing through the pixels,
    wherein the bank pattern is shaped as a plurality of protrusions from the array substrate to divide each pixel into a red (R) sub-pixel, a green (G) sub-pixel and a blue (B) sub-pixel,
    the R sub-pixel includes at least a red emission dopant or red color filter that changes blue light beams from the light source into red light beams,
    the G sub-pixel includes a green emission dopant or green color filter that changes the blue light beams from the light source into green light beams,
    the B sub-pixel does not include any emission dopant or color filter to allow the blue light beams from the light source to pass through,
    the array substrate is configured to allow the blue light beams from the light source to pass therethrough,
    the blue light beams passing through the array substrate are same as the blue light beams reaching the R sub-pixel, the G sub-pixel, and the B sub-pixel, and
    the encapsulation layer is configured to protect the red emission dopant or red color filter and the green emission dopant or green color filter from external moisture.

12. The apparatus of claim 11, wherein the light source is configured as one among a direct view type, rear projection type and a reflection type, and configured to have light generating diode elements.

13. The apparatus of claim 11, wherein the array substrate achieves relatively high aperture ratio due to not requiring any thin-film transistors, gate lines and data lines having to be provided thereon.

14. The apparatus of claim 11, wherein the optical elements are configured to magnify the RGB light from the pixels to allow projection onto a desired surface.

15. The apparatus of claim 11, wherein the array substrate is made of flexible plastic that is bendable or foldable, and the emission dopants are part of fluorescent or phosphorescent material provided on the array substrate.

16. The apparatus of claim 11, wherein the optical elements comprise at least one among: a beam path converter between the array substrate and the light source to reflect the blue light beams towards the pixels, a modulator between the array substrate and the light source to regulate the blue light beams according to image gray scale information, a scattering layer or material that provides for relatively wide viewing angle.

17. The display device of claim 1, wherein the encapsulation layer is a thin film encapsulation configured to adhere to the transparent substrate having the bank pattern disposed thereon.

18. The display device of claim 1, wherein the second color sub-pixel further includes the second dopant.

19. The apparatus of claim 11, wherein the encapsulation layer is a thin film encapsulation configured to adhere to the array substrate having the bank pattern disposed thereon.

20. The apparatus of claim 11, wherein the R sub-pixel further includes the green emission dopant or green color filter.

\* \* \* \* \*